(12) United States Patent
Le Beux

(10) Patent No.: US 6,903,843 B1
(45) Date of Patent: Jun. 7, 2005

(54) PROCESS AUTOMATICALLY SELECTING THE SIZE OF PRINT SUPPORT FOR EDITING DIGITAL IMAGES

(75) Inventor: Jean-Claude Le Beux, Vincennes (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/257,655

(22) Filed: Feb. 25, 1999

(30) Foreign Application Priority Data

Apr. 10, 1998 (FR) .............................. 98 04882

(51) Int. Cl.$^7$ ............................... G06F 15/00
(52) U.S. Cl. ................... 358/1.9; 358/1.9; 358/358; 358/1.18; 358/450
(58) Field of Search ................ 358/1.1, 1.9, 1.12, 358/1.13, 1.14, 1.15, 1.17, 1.18, 449, 450, 473; 378/174, 175

(56) References Cited

U.S. PATENT DOCUMENTS

| | | | |
|---|---|---|---|
| 4,994,827 A | | 2/1991 | Jamzadeh et al. |
| 5,051,904 A | | 9/1991 | Griffith |
| 5,191,429 A | * | 3/1993 | Rourke ..................... 358/296 |
| 5,485,554 A | * | 1/1996 | Lowitz et al. ............. 358/1.17 |
| 5,504,583 A | * | 4/1996 | Jamzadeh et al. .......... 358/302 |
| 5,521,720 A | * | 5/1996 | Yoshida ..................... 358/448 |
| 5,528,492 A | * | 6/1996 | Fukushima ................. 707/1 |
| 5,694,486 A | * | 12/1997 | Shigeeda et al. ........... 382/197 |
| 5,739,897 A | * | 4/1998 | Frick et al. ................ 355/40 |
| 5,768,488 A | * | 6/1998 | Stone et al. ............... 358/1.18 |
| 5,777,753 A | * | 7/1998 | McShane et al. ........... 358/302 |
| 5,786,904 A | * | 7/1998 | Narita ....................... 358/471 |
| 5,838,457 A | * | 11/1998 | Umemoto ................... 358/302 |
| 5,934,777 A | * | 8/1999 | Patton et al. .............. 353/121 |
| 5,978,551 A | * | 11/1999 | Koyama ..................... 358/1.18 |
| 6,031,632 A | * | 2/2000 | Yoshihara et al. .......... 358/403 |
| 6,079,885 A | * | 6/2000 | Sano ......................... 400/76 |
| 6,088,136 A | * | 7/2000 | Kraft et al. ................ 358/506 |
| 6,094,217 A | * | 7/2000 | Nishimura .................. 348/103 |
| 6,144,777 A | * | 11/2000 | Tada et al. ................. 382/284 |
| 6,195,513 B1 | * | 2/2001 | Nihei et al. ................ 396/332 |
| 6,222,947 B1 | * | 4/2001 | Koba ......................... 382/284 |
| 6,282,330 B1 | * | 8/2001 | Yokota et al. .............. 382/309 |
| 6,476,940 B1 | * | 11/2002 | Kageyama .................. 358/468 |
| 2001/0035875 A1 | * | 11/2001 | Suzuki et al. .............. 345/723 |
| 2002/0051208 A1 | * | 5/2002 | Venable ..................... 358/1.18 |
| 2003/0072486 A1 | * | 4/2003 | Loui et al. ................. 382/175 |
| 2003/0128390 A1 | * | 7/2003 | Yip et al. .................. 358/1.18 |

FOREIGN PATENT DOCUMENTS

| | | |
|---|---|---|
| EP | 330343 | 8/1989 |
| EP | 661604 | 7/1995 |

\* cited by examiner

Primary Examiner—Nark Wallerson
(74) Attorney, Agent, or Firm—Susan L. Paralski

(57) ABSTRACT

The invention relates to the automatic printing of medical digital images. Medical imaging systems especially comprise a medical imaging device 1, a signal processing and image display station 2, a data entry device 4 allowing the selection of the print support format, and a printer 3 allowing the images to be printed. According to the invention, an analyzer of the images to be printed 8 allows the automatic ordering of the print support format selected by the printer 3. Application to the automatic selection of print support formats in medical digital imaging.

3 Claims, 2 Drawing Sheets

PROCESS AUTOMATICALLY SELECTING THE SIZE OF PRINT SUPPORT FOR EDITING DIGITAL IMAGES

FIELD OF THE INVENTION

The present invention relates to printing of digital images and especially to printing digital radiology images on a film support.

BACKGROUND OF THE INVENTION

Usually, when wanting to print digital images, data relating to the paper format that is to receive the print information, is sent to the printer. Because of the variety of sizes of information supports, some printers have devices for checking the size of the information support available, other printers are equipped with several trays allowing several recording support formats to be offered.

Many printers for printing medical digital images offer two film sizes at the same time, and the user determines in advance the size of film wanted for use.

Usually, the medical imaging system comprises, as represented in FIG. 1, at least one medical imaging device 1, for example such as an MRI, CT scanner, digital radiology, echography machine, etc. linked to a viewing station 2. The viewing station 2 comprises a computer for processing the signal coming from the medical imaging device in order to modify the appearance of the image, thus making diagnosis easier. In general, at least one selection of images obtained by the medical imaging device 1 is sent to a printer system 3 via a link 6, for example a bus, so as to print the images on a print support 5 such as film for example. Therefore the user selects on a keyboard 4 linked to the bus 6, or on a menu displayed at the viewing station, for example, the size of the film and the number of images to print on this film. A computer linked to the bus 6 takes this data and generates a "bitmap" image in which each point of the image is represented by its digital values (gray levels or three-color). This bitmap image is sent to the printer system 3 for example via the bus 6. In usual systems the last print format used is selected by default for the next printing.

When a series of many images is being printed, it is usual and normal to think of supplying the print support format at the start of the printing operation. Given the large number of images to be printed, the operator will usually select a large size support. However, it often happens that the last images of the series are less numerous and that, in this case, they could be printed on a small size support. Such printing of the last images of a series onto a smaller format support is not always done as this operation generally requires the print support format to be changed in advance, takes time and requires the operator to intervene.

SUMMARY OF THE INVENTION

It is an object of the invention to save using large size films when without inconvenience this large size film can be replaced by small size film.

Thus it is an object of the invention to check the attributes of the printing sequence supplied to the computer calculating the bitmap image transmitted to the printer, so as to automatically adapt the print support size according to the attributes of the sequence of images to be printed.

The process according to the invention is intended to automatically select a print support format from among several available formats for a printer receiving a series of images to be printed on the same print support page. According to the invention, the attributes of the series of images to be printed are tested and according to the results of this test the print support format onto which the series of images is to be printed is selected.

BRIEF DESCRIPTION OF THE DRAWINGS

Other features and advantages of the invention will appear on reading the description below with reference to the drawings in appendix wherein.

DETAILED DESCRIPTION OF THE INVENTION

Figure 1:
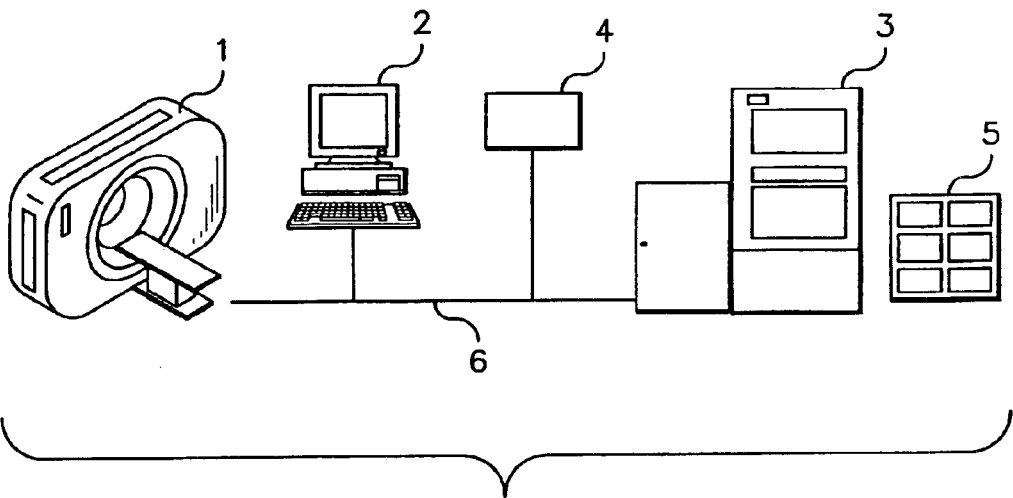
FIG. 1 represents a digital image processing system using prior art technology.
Figure 2:
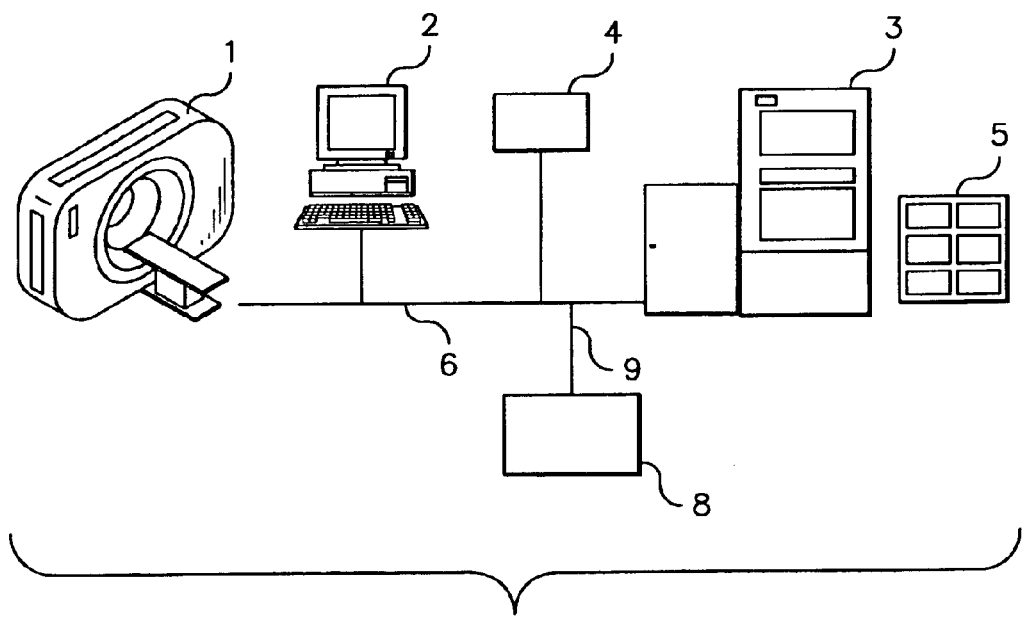
FIG. 2 represents the modification according to the invention.

As can be seen in FIG. 2, the imaging system comprises, in addition to the conventional imaging system, an analyzer 8 for the series of images to be printed on a single page of print support. This device 8 is linked by a connection 9 to the computer that created the bitmap image sent to the printer system 3. Clearly this analyzer 8 can be incorporated in any one of the workstations making part of the medical imaging system.

According to the invention, the analyzer 8 intercepts the data sent to the computer responsible for creating the bitmap image that will be supplied to the printer system 3, so as to enable modification of the behavior of this computer.

Figure 3:
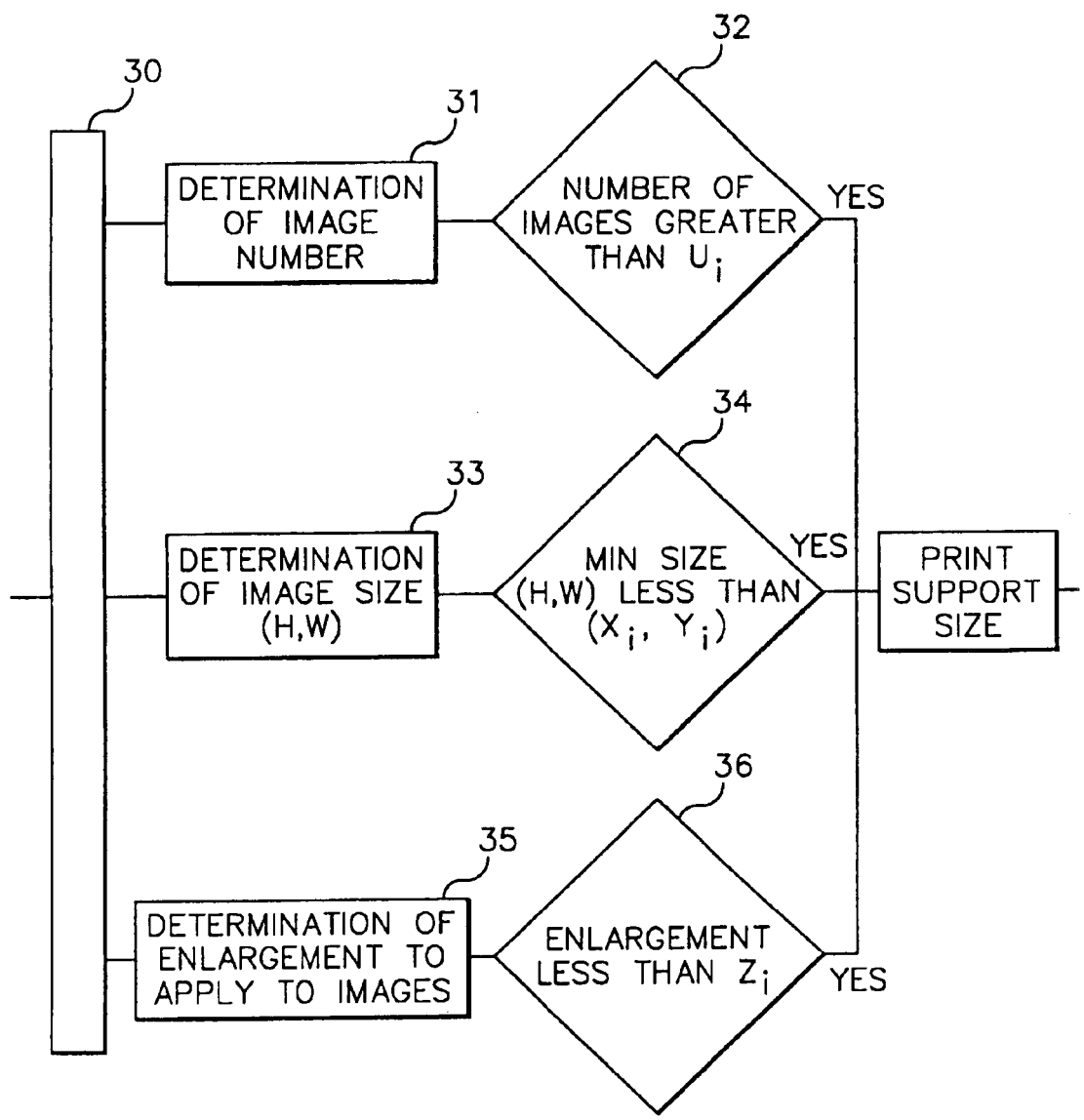
FIG. 3 represents an example of an algorithm that can be used according to the invention.

FIG. 3 diagrammatically represents one possibility for the analyzer 8 according to the invention. In this embodiment, first the various tests that can be used on the series of images sent to the computer are selected using a circuit 30. Clearly circuit 30 can be obtained either by a physical circuit or by a program choice displayed on a display screen. These tests can comprise one or more checking and/or comparison steps. Among these tests there is in particular, as in 31, 32, the determination of the number of images of the series to be printed on the print support. Such a test is very useful for printing a large number of images all of the same size coming, for example, from a scanner or an echography machine. In this case the maximum number of images $U_i$ of this type that can be displayed at the same time on a print support of a given format can be determined in advance; i defines the print support format, and the number $U_i$ can be memorized as a parameter. The comparison of the number of images to be printed with the number of possible images $U_i$ on a set format allows easy determination of the format to be used. Clearly if the number of images to be printed on the same page of the support is less than the possible number of images for a print format then a check can be made to see if there is a smaller format print support available and whether it can contain the number of images to be printed. At the time of printing the size of the print support finally selected is supplied to the computer generating the bitmap image to be printed. In a particular embodiment, the number of images coming from an echography machine supplying an image to be used for diagnosis is six for a print support format of 28*35 cm.

Another possible test consists in determining, as represented in 33, the actual dimension of the images obtained on the film of a given format. This dimension can be obtained by multiplying the number of pixels, horizontal or vertical, of an image by the distance between each pixel and then multiplying by the enlargement to be applied to include the images for printing in the print area of the page of the print support. A vertical dimension or height H and a horizontal dimension or width W are obtained for each image of the series. It would be useful not to print images too small. In these conditions for each dimension of the print support, an image dimensions parameter $(X_i, Y_i)$ is determined in advance, below which a larger size print support is selected if possible. The dimensions of the smallest image of the image series to be printed is compared, as set in 34, with the minimum dimensions $(X_i, Y_i)$ of an image on a set support, and if at least one of the dimensions of the image is less than the corresponding minimum dimension, a check can be made for the availability of a larger print support. In one particular embodiment it has been decided that the size of the images to be printed on a small format print support will not be less than 5*5 cm.

A third possible test consists in determining in a vance a minimum enlargement threshold $Z_i$ for a print support format; this threshold being memorized as a parameter associated with a print support size. In 35 for each series of images to be printed on the same page of a print support an enlargement to be applied to the juxtaposition of the images in the layout wanted is determined so that the dimensions of the juxtaposition of the images corresponds to the print area of the print support. In 36 this enlargement is compared with the minimum enlargement for the print support format. When this calculated enlargement is less than the minimum enlargement $Z_i$ associated with the format, a check is made to print on a larger size print support. In one particular embodiment it has been decided that the enlargement of the images to be printed on a small format print support should not be less than 40%. Reference can be made to French Patent Application 97 07388 filed on 9 Jun. 1997 by the applicant for more detail on the enlargement calculation.

In another embodiment, the images to be printed are digital images obtained from digital radiographic images. In photostimulated screen digital radiology, images are captured on plates available in three different sizes, 18*24 cm, 24*30 cm, and 36*43 cm. In this application area, the dimensions of the photostimulated plate represent the dimensions of images. Thus a new comparison test can be created by allocating to each image a set weight, according to its dimension, and by adding together the various weights of the images of the series of images to be printed on the same page of print support. The result obtained is compared with an empirically set threshold, and taken as a parameter, according to the respective weights of the images. In the embodiment used the weights are 100 for an image supplied by a plate dimension 18*24 cm, 115 for an image supplied by a plate dimension 24*30 cm and 171 for an image supplied by a plate dimension 36*43 cm. For example if a print support is to be printed with one image from a 24*30 cm plate and one image from a 36*43 cm plate, the result of the sum of the weights is 115+171=286. This result is compared to an empirically set threshold. When the threshold parameter is set to 250, both images are printed on a large format print support. When the threshold is set to 300, both images are printed on a small format print support. This algorithm allows the simple use of both the sizes and the number of images to be printed on the same page of print support.

Clearly other comparison algorithms can be used.

What is claimed is:

1. A process intended to automatically select a format of a print support from among several available formats for a printer receiving a series of digital images to be printed on the same page of a print support, this series having attributes allowing a presentation of the images on the print support to be defined, and in which the attributes of the series of images to be printed is tested and according to the result of this test, the format of the print support onto which the series of images is printed, is selected, wherein the height and width of images printed on a page of a given format are simulated, and when at least one dimension of the images is less than a respective threshold determined according to the format of the print page, a larger dimension format available is selected.

2. A process intended to automatically select a format of a print support from among several available formats for a printer receiving a series of digital images to be printed on the same page of a print support, this series having attributes allowing a presentation of the images on the print support to be defined, and in which the attributes of the series of images to be printed is tested and according to the result of this test, the format of the print support onto which the series of images is printed, is selected, wherein after having calculated an enlargement to be applied to the series of images to be printed on a page of a given format, the enlargement is tested against an enlargement threshold.

3. A process intended to automatically select a format of a print support from among several available formats for a printer receiving a series of digital images to be printed on the same page of a print support, this series having attributes allowing a presentation of the images on the print support to be defined, and in which the attributes of the series of images to be printed is tested and according to the result of this test, the format of the print support onto which the series of images is printed, is selected, wherein a set weight is allocated to each image dimension, the weights of the various images of the series of images to be printed on the same page of print support is summed and the result is compared to a given threshold in order to select the print support format.

* * * * *